March 7, 1933.  H. C. SNYDER  1,900,619
COOKING UTENSIL
Filed Nov. 18, 1930   3 Sheets-Sheet 1

Inventor
H. C. Snyder
By Lacey & Lacey, Attorneys

March 7, 1933.　　　H. C. SNYDER　　　1,900,619
COOKING UTENSIL
Filed Nov. 18, 1930　　　3 Sheets-Sheet 2

Inventor
H. C. Snyder
By Lacey & Lacey
Attorneys

March 7, 1933.    H. C. SNYDER    1,900,619
COOKING UTENSIL
Filed Nov. 18, 1930    3 Sheets-Sheet 3
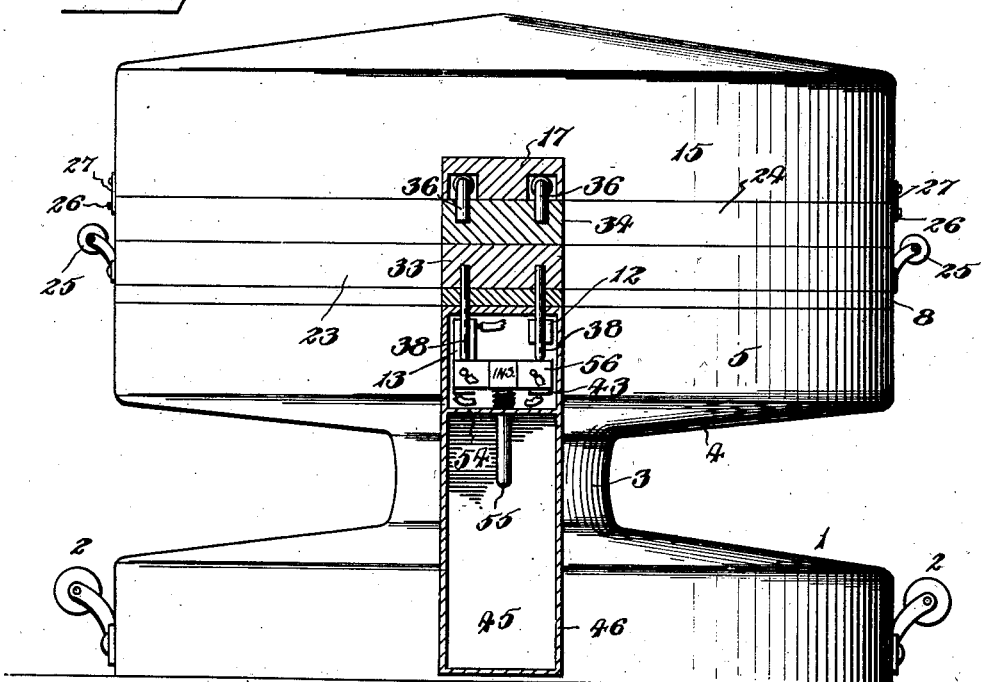
Fig. 5.
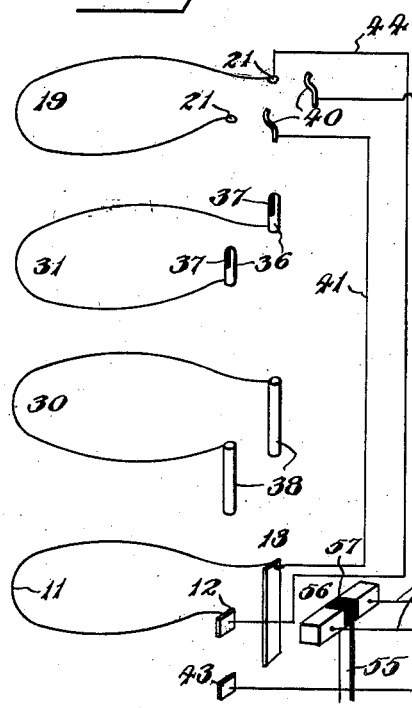
Fig. 7.
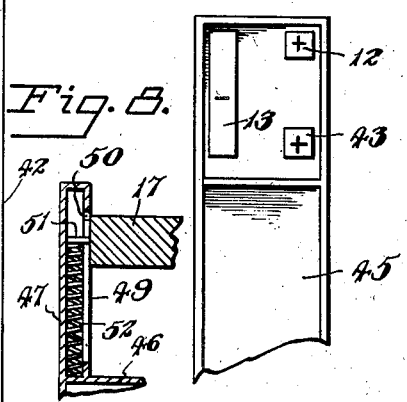
Fig. 6.
Fig. 8.
Inventor
H. C. Snyder
Lacey & Lacey
Attorneys Patented Mar. 7, 1933

1,900,619

UNITED STATES PATENT OFFICE

HENRY C. SNYDER, OF KIS-LYN, PENNSYLVANIA

COOKING UTENSIL

Application filed November 18, 1930. Serial No. 496,444.

This invention relates to electric toasters and the like and has for its object the provision of an implement which may be easily shifted from place to place and which may be operated upon a breakfast table so that hot food may be quickly prepared with slight inconvenience. A more specific object of the invention is to provide a utensil which may be utilized as a toaster or as a waffle iron as may be desired and in which, when the waffle iron is employed, the heating current will be automatically cut off from the toaster and sent through the waffle iron. The invention also has for its object the provision of novel means for feeding the current to the toaster or the waffle iron and to so arrange the parts that injury to the operator through inadvertence or carelessness will be avoided. The invention is illustrated in the accompanying drawings and consists in certain novel features which will be hereinafter first fully described and then more particularly pointed out in the appended claims.

Figure 1:
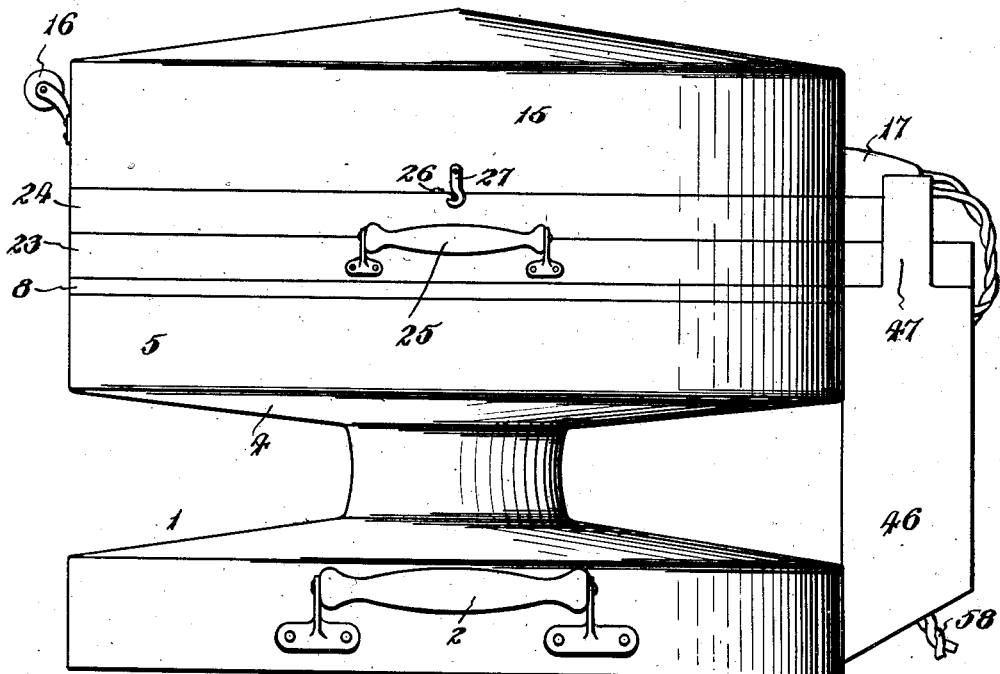
Figure 1 is a side elevation of a utensil embodying the invention.
Figure 4:
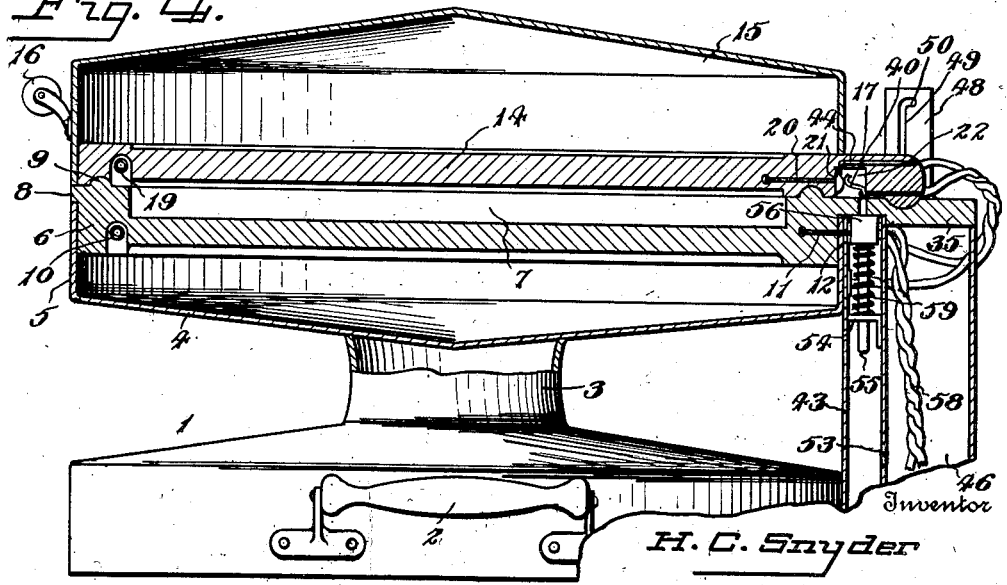
Figure 2:
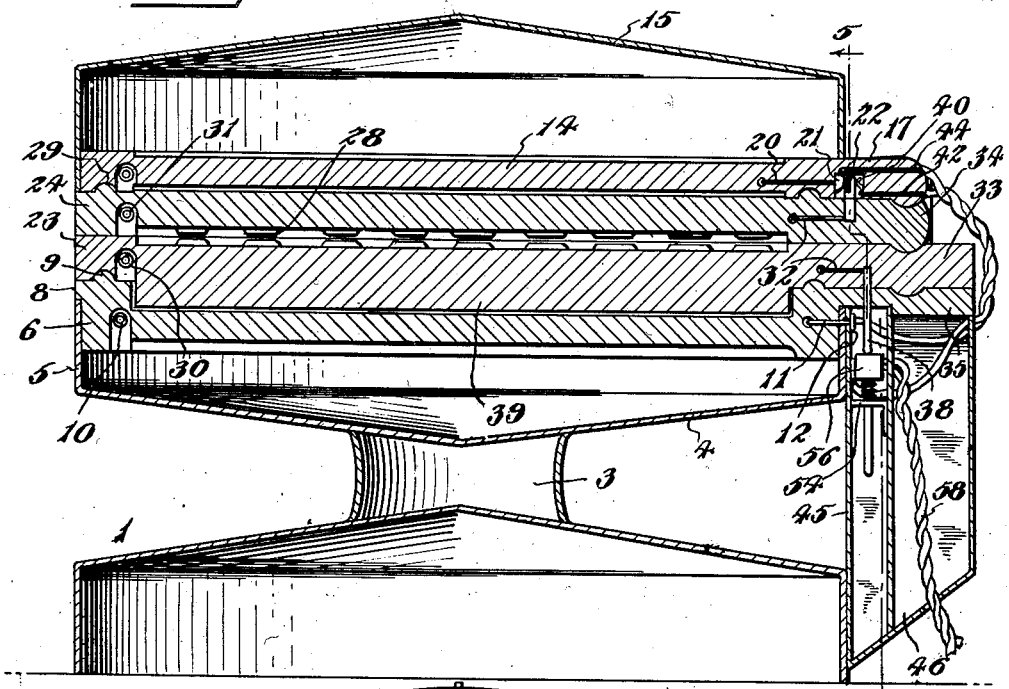
Fig. 2 is a diametrical section of the same.
Figure 3:
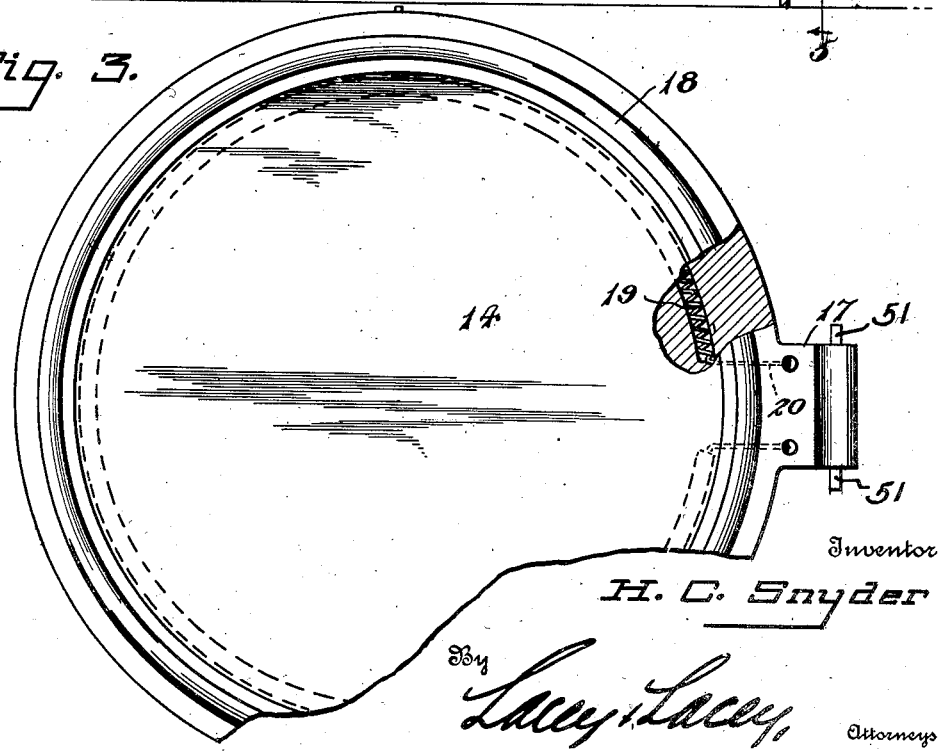
Fig. 3 is a plan view of the upper grid or top member of the toaster.

Fig. 4 is a diametrical section similar to Fig. 2 but showing the device arranged as a toaster or pan, the waffle iron being removed, Fig. 5 is an elevation with parts in section on the line 5—5 of Fig. 2, Fig. 6 is an enlarged elevation of a portion of the casing in which the automatic switch is mounted, Fig. 7 is a diagram showing the electric circuits, and Fig. 8 is a detail section through the hinge support of the upper toaster member.

In carrying out the invention, there is provided a base member 1 which is preferably of sheet metal and may be of aluminum or more precious metal as preferred. This base member is equipped with handles 2 at diametrically opposite points for convenience in lifting the device and also to avoid burning of the user if the utensil should be lifted before it has thoroughly cooled. Rising centrally from the base member is a neck 3 which is of greatly reduced diameter relative to the base and thereby aids in imparting an attractive appearance to the device, an upper supporting member 4 being fixed to the neck and disposed concentric therewith and preferably of the same diameter as the base member. This upper supporting member 4 has an annular upstanding rim 5 within which is fitted the lowest grid or pan 6. Said pan 6 is a disk having its peripheral portion of a greater vertical extent than its central body portion, thereby providing a recess 7 in its upper surface which may be utilized as a pan, as, for instance, for broiling bacon. Adjacent the upper surface of the marginal portion of the grid, an external annular rib 8 is formed thereon which extends over the edge of the rim 5 of the supporting member and thereby attains a firm mounting of the disk in the support. There is also an annular rib 9 formed on the upper edge surface of the margin of the member 6 which adds height to the pan so that overflowing of any juice or fluid matter which may be in the pan will be less apt to occur. This rib also serves as a guide in fitting other elements of the utensil upon the pan, as will presently appear. The grid member or pan 6 is heated by a resistance coil 10 which is disposed within the marginal portion of the same, as will be understood upon reference to Figs. 2 and 4, and this resistance coil has its ends merged into conducting wires 11 which are extended outwardly through the marginal portion of the grid at a point adjacent the hinge point of the utensil and secured to contact elements 12 and 13 which will be presently more fully described.

The grid 6 cooperates with an upper grid 14 when the device is to be used as a toaster and the said upper grid 14 is fitted marginally within a cover or lid 15 which is equipped with a handle 16 whereby it may be swung upwardly when desired. The grid 14 is secured closely within the depending rim portion of the cover 15 and has one end extended through said rim, as shown at 17. In the under side of the grid 14 is an annular groove 18 which is adapted to engage over the rib 9 on the lower grid when the device is arranged as a toaster, as shown in Fig. 4, whereby the parts will be properly centered. A resistance coil 19 is embedded in the grid 14 and corresponds to the coil 10 in the lower grid so that when the current is transmitted to these coils the two grids will be heated and toast quickly produced or other light cooking performed. The terminals of the coil 19 extend through the marginal portion of the grid 14, as shown at 20, and terminate in projections 21 which may be easily engaged by cooperating contact members to close a circuit through the heating coil and thereby quickly heat the grid, said terminals 21 being disposed within a recess 22 in the bottom of the extension 17, as clearly shown in Figs. 2 and 4.

The waffle iron comprises a lower iron 23 and an upper iron 24 which are very similar in construction and which are adapted to receive between them batter to produce a waffle, the lower iron 23 being provided at diametrically opposite points with handles 25 whereby the irons may be easily lifted and the upper iron being provided at diametrically opposite points with studs or lugs 26 which are adapted to be engaged by catches 27 upon the lid 15 whereby the cover will be attached firmly to the upper iron and will not be apt to be accidentally lifted while the device is in use. The irons 23 and 24 are provided with the usual waffle iron grid formation, as indicated at 28, on their opposed faces and the lower iron is formed with an annular groove in its under side adapted to engage over the rib 9 on the lower grid 6 while the upper iron 24 has an annular rib 29 on its upper surface which is adapted to engage in the groove 18 in the upper grid 14, as shown in Fig. 2. Resistance coils 30 and 31 are embedded in the upper and lower irons respectively to provide heat therefor, and these coils have their ends extended laterally adjacent the margins of the irons, as shown at 32, to be engaged by cooperating contact elements. The irons are also provided with extensions 33 and 34 respectively corresponding to the extension 17 of the upper grid and the extension or elongation 35 of the lower grid 6. These several extensions are provided with grooves in their upper faces and corresponding ribs on their lower faces, as shown clearly in Fig. 2, whereby they may readily nest and an upper member may work as on a hinge relative to the lower member. The terminal portions 32 of the coil 31 in the upper waffle iron are attached to terminal contacts 36 which are embedded in the extension 34 and project upwardly through the top of the same to enter the chamber 22 in the upper grid 14 when the waffle iron is in use, as shown in Fig. 2. It will be noted that the terminal contacts 22 are provided with insulation on their inner sides at their upper ends and these insulated portions 37 are adapted to bear against the terminal contacts 21, as clearly shown in Fig. 2, so that when the waffle iron is in use the current will be cut off from the upper grid. The terminal portions 32 of the resistance coil 30 in the lower waffle iron are attached to terminal contact pins 38 which extend downwardly through the bottom of the lower waffle iron and are adapted to pass through openings provided therefor in the extension of the lower grid 6, and it may be noted at this time that the lower waffle iron has a central enlargement or boss 39 on its under side which fits within the recess or pan portion of the lower grid 6 and thereby further aids in properly centering the several elements.

Located within the chamber 22 in the upper grid 14 are resilient contact fingers 40 which are adapted, when the device is used as a toaster, to engage the respective contact terminals 21, a wire 41 leading from one of said resilient fingers to the contact plate 13 and a wire 42 leading from the other resilient finger to a lower contact plate 43 which corresponds to the plate 12 in size and form and is located in the vertical plane of said plate 12, it being noted particularly upon reference to Figs. 6 and 7 that the plates 12 and 43 are arranged in vertical alinement at one side of and parallel with the plate 13 and that the plate 13 is of such length that a switch member may bridge the space between said plate 13 and either of the plates 12 and 43. From one of the contacts 21, a wire 44 leads to the upper contact plate 12, as shown in Fig. 7. The plates 12, 43 and 13 are secured upon a switch plate or support 45 which is secured to the base 1 and the rim 5 of the upper support 4, as best shown in Fig. 2, said switch plate 45 forming the back of a casing 46 which houses the switch elements and extends from a point near the bottom of the base to the extension 35 of the lower grid 6. The casing is provided with posts or upstanding arms 47 at its upper end which are of tubular formation, as shown most clearly in Fig. 8, and are provided in their inner walls 48 with slots 49 having notches or seats 50 at their upper ends. The extension 17 of the upper grid 14 is provided at its ends with pins or studs 51 which pass through the slots 49 and are drawn toward the lower ends of the slots by a retractile springs 52 housed within the tubular arms 47, as clearly shown in Fig. 8. This arrangement provides an expansion hinge which will permit the waffle iron members to spread apart under the influence of the expanding batter or dough and will also hold the upper member or grid 14 close to the lower grid 6 when the device is used as a toaster. Moreover, by rocking the cover 15 and then pushing it slightly rearward so as to engage the pins 51 in the notches or seats 50, the cover with the elements connected thereto may be set in open position which is advantageous when a cooked waffle is being withdrawn from the waffle irons and new batter placed therein.

Within the casing 46 is an intermediate plate or standard 53 upon which is a bracket 54 furnishing a guide for the post or stem 55 of the switch member 56. The switch 56 is a bar of proper dimensions to span the contact plates 13 and 12 or 13 and 43, as shown in Fig. 5. The central portion of this switch body 56 is of insulation, as shown at 57 in Fig. 7, while the end members are of conducting material and have attached thereto the feed wires 58 which may be equipped with the usual plug connection for engagement in an ordinary lamp socket. A spring 59 is coiled around the stem 55 between the bar 56 and the bracket 54 and yieldably holds the bar in raised position. When the device is used as a toaster, the waffle irons are removed, as will be understood upon reference to Fig. 4, and inasmuch as there will then be a minimum load imposed upon the bar 56, said bar will be held at the upper limit of its movement against the under side of the lower grid or of the extension 35 of the same so that the end conducting portions of the bar will be in contact with the plates 12 and 13 respectively. Obviously, then a circuit is closed through the lower resistance coil 11 to heat the lower grid 6. When the upper grid 14 is brought down so as to rest on the lower grid, the contacts 36 and 38, of course, will not be present and the resilient fingers 40 will be free to engage against the terminal contacts 21. A circuit will then be closed through the upper resistance coil 19 from the positive end member of the bar 56 and thence up through the wire 44 to one end of the coil 19 and through the coil to the cooperating finger 40 and thence over the wire 41 to the plate 13 and the negative end of the bar 57 so that the upper coil 19 will be heated. When the waffle iron is used. it will be fitted between the lower and upper grids 6 and 14, as shown in Fig. 2. When the waffle iron is put in place, the contact pins 38 of the lower iron will pass downwardly through the opening provided therefor in the lower grid 6 and rest on the end portions of the switch bar 57 so that said bar will be depressed as shown in Fig. 2, and its end members will then be in contact with the plate 13 and the plate 43. The upper grid 14 is placed over the upper waffle iron, as shown in Fig. 2, and the contact terminals 36 will thereupon extend into the chamber 22 and be interposed between the spring fingers 40 and the contacts 21 so that the contacts 21 will be cut off from the current by the insulated faces 37 of said contact pins 36 while the conducting faces of said pins will engage said spring fingers. Current will then be sent through the coil 30 in the lower waffle iron directly from the bar 56 through the elongated pins 38 while the upper coil 31 will receive current flowing through a circuit from the plate 43 over the wire 42 to one finger 40, thence through the terminal pin 36 and the coil 31 to the other pin 36 and thence from the wire 41 to the plate 13 and the negative end of the switch bar 56 so that the upper iron will be heated.

The conducting wires will, of course, be insulated and housed in cables, as clearly shown in Figs. 2 and 4, and it will be readily noted that, except for the necessarily short exposed portions of the upper cable, all of the conducting wires are housed within the elements to which they convey current and by the casing 46. Whether the device is used as a toaster or as a waffle iron, the circuit through the elements to be heated is automatically established when the plug of the cable 58 is engaged in a lamp socket. The device is simple and compact and may be freely used by unskilled persons without fear of injury through short circuits or similar causes. By the use of this device lunches and breakfast may be quickly prepared and several implements are brought into a compact arrangement so that either may be used without detriment to the others and without requiring a large amount of storage space for taking care of the different elements when they are not in use.

Having thus described the invention, I claim:

1. In a device of the character described, a support, tubular arms rising from the support and provided in their inner walls with vertical slots and notches at the upper ends of the slots, a grid element having pins at its ends engaged through said slots, and retractile springs housed within said tubular arms and engaged with the pins whereby to hold the grid in its lower position.

2. A device of the character described comprising upper and lower grids, a support therefor, upper and lower irons insertab'e between the grids, and circuits for heating the irons, said circuits including contact elements on the irons and contact elements on the support and the upper grid to be engaged by the contact elements on the irons upon engagement of the irons between the grids.

3. A device of the character described comprising upper and lower grids, means for heating the grids. upper and lower irons insertable between the grids, means for heating the irons, and means whereby the last-mentioned heating means will be rendered operative and the first-mentioned heating means will be rendered inoperative when the irons are inserted between the grids.

4. In a device of the character described, upper and lower grids, upper and lower irons insertible between the grids, resistance coils embedded in the grids and in the irons, and means for supplying current to the several heating coils, the coils of the grids being automatically cut out and the coils of the irons being rendered operative when the irons are fitted between the grids.

5. A device of the character described com-insertable between the grids, resistance coils within the grids, contact elements at the ends of the respective coils, cooperating contact elements adapted to close circuits through the respective coils when the grids are in operative position, a switch bar carrying supply conductors and engageable with the terminals of the lower coil, and electrical connections between the terminals of the upper and lower coils.

6. A device of the character described comprising upper and lower grids, upper and lower irons insertable between the grids, heating coils within the grids and within the irons, the upper grid being provided with a recess in its under side in which the terminals of the coil in said grid are located, coacting contact fingers disposed within said recess, terminal contact fingers connected with the coil in the upper iron and extending upwardly from said iron, said fingers having insulated portions whereby when the upper grid is imposed on the upper iron said contact pins will engage between and separate the contact elements in the recess in the upper grid and will make electrical connection with the resilient fingers, and means for energizing the coil in the lower iron and simultaneously cutting out the coil in the lower grid.

7. In a device of the character described, upper and lower grids, upper and lower irons engageable between the grids, resistance coils in the several irons and grids, means whereby when the upper grid is imposed on the upper iron the coil in the grid will be cut out and the coil in the iron will be rendered operative, terminal pins connected to the coil in the lower iron and projecting downwardly therefrom to extend through the lower grid, and a feed switch bar supplying current to the several coils and engaged by said depending pins whereby to be moved from the terminals of the coil in the lower grid when the irons are fitted thereon.

In testimony whereof I affix my signature.

HENRY C. SNYDER.